Dec. 24, 1963　　　L. W. ALEXANDER　　　3,115,373

PERMANENTLY SELF-ALIGNED BEARING INSTALLATION

Filed June 19, 1961

INVENTOR.
LEWIS W. ALEXANDER.
BY Barthel & Bugbee
ATTORNEYS.

United States Patent Office 3,115,373
Patented Dec. 24, 1963

3,115,373
PERMANENTLY SELF-ALIGNED BEARING
INSTALLATION
Lewis W. Alexander, Northville, Mich., assignor, by mesne assignments, to Polymer Processes, Inc., Reading, Pa., a corporation of Pennsylvania
Filed June 19, 1961, Ser. No. 117,899
3 Claims. (Cl. 308—22)

This invention relates to bearings and, in particular, to shaft bearings or the like which adjust themselves during assembly to remove slight misalignments of the shaft axis relatively to the mounting bore axis.

One object of this invention is to provide a self-aligned bearing which is adhesively mounted during assembly in such a manner as to permanently remove slight misalignments of shaft and mounting bore in contradistinction to mechanically self-aligning bearings which have parts adapted to rock relatively to one another during operation.

Another object is to provide a self-aligned bearing of the foregoing character wherein the bearing element, such as a bearing bushing, is held rigidly in position when once installed and aligned during assembly, thereby giving longer life and less wear to the bearing and permitting much less vibration, hence creating much less noise during operation in contrast to prior mechanically self-aligning bearings where the rattle amplitude comes up to the bearing clearance and hence permits much greater vibration and noise.

Another object is to provide an adhesively-mounted self-aligned bearing of the foregoing character wherein the bearing element, such as a bearing sleeve or bushing, is mounted in the bearing bore by means of a non-metallic material, such as an epoxy resin wherein change of state between solid and liquid conditions takes place more gradually over a wide temperature range, and which wets the surface of the mounting bore and consequently fully fills the space between the element and the mounting bore and leaves no gap therein, in contrast to which prior metal-mounted bearing sleeves using fusible metal of the Babbitt type have a very short temperature range between solidity and fluidity which causes the metal to behave like mercury and run out of the mounting bore without wetting the metal bore surface or fully filling the space therebetween.

Another object is to provide an adhesively-mounted self-aligned bearing of the foregoing character wherein the mounting contact is at circumferentially-spaced intervals so as to avoid deforming the bearing, such as occurs in previous Babbitt-mounted sleeve bearings having annular line contact with their mounting bores.

Another object is to provide an adhesively-mounted self-aligned bearing of the foregoing character wherein the parts can be coated without setting of the resin, and automatically self-aligned in response to assembling of the parts.

Another object is to provide an adhesively-mounted self-aligned bearing of the foregoing character wherein the time of setting can be accurately controlled by regulation of temperature because of the use of a non-metallic mounting material, in contrast to the lack of such control in metal-mounted bearings.

Other objects and advantages of the invention will become apparent during the course of the following description of the accompanying drawings, wherein.

Figure 3:
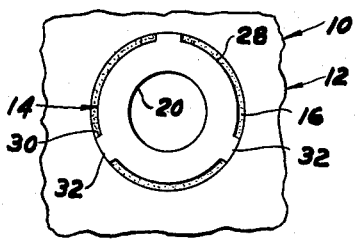
FIGURE 3 is a front elevation of an adhesively-mounted self-aligned bearing installation employing the bearing bushing of FIGURES 1 and 2.
Figure 5:
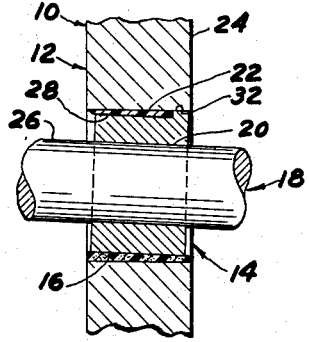
FIGURE 5 is a view similar to FIGURE 4, but showing the bearing bushing of FIGURES 1 and 2 inserted in the bearing mount of FIGURE 4 and aligned by means of a shaft.

Referring to the drawing in detail, FIGURES 3 and 5 show an adhesively-mounted self-aligned bearing installation, generally designated 10, consisting generally of a bearing mount 12, a bearing bushing 14, and a layer 16 of adhesive plastic packing material forming an aligning connection between the bearing mount 12 and the bearing bushing 14 for properly aligning the shaft 18 and a shaft-receiving bore 20 relatively to the mounting bore 22 in the bearing mount 12.

The bearing mount 12 may be of any suitable construction determined by the particular machine in which it is used, the form shown being a metal wall or partition of cast iron, bronze, steel, aluminum or the like, such as the end wall or head of a pump or motor (not shown). The bore 22 is preferably a cylindrical bore for convenience of machining, with its axis ordinarily disposed perpendicular to a reference face 24 of the bearing mount 12. Since, however, the wall or other bearing mount 12 may be located so that the axis of the mounting bore 22 is not the proper axis for the shaft 18 which is to rotate or slide relatively to the mount 12, it is necessary that the bearing bore 20 of the bearing bushing 14 be tilted or angled properly to insure that the bearing bore 20 shall be precisely located with its axis coincident with the desired location for the axis of the shaft 18 when the cylindrical outer surface 26 of the shaft 18 is in bearing engagement with the bearing bore 20.

The bearing bushing 14, as its name suggests, is of generally hollow cylindrical form with a cylindrical outer surface 28 from one end of which circumferentially-spaced radial lands or fulcrum portions 30 project outwardly and have partially cylindrical outer surfaces 32 adapted to pivotally engage one end of the mounting bore 22 (FIGURE 5) so that the forward and rearward ends or faces 34 and 36 will be enabled to be positioned in a slightly tilted condition in order to properly align the axis of the shaft 18. The bearing bushing 14 may be of any suitable metallic or non-metallic material, such as cast iron, steel, brass or bronze for metals, or it may consist of the non-metallic bearing bushing 40 of FIGURES 6 and 7. The bearing bushing 40 may conveniently be formed from sintered polyamide plastic material, commercially known as nylon, with cylindrical inner and outer surfaces 42 and 44, the latter having at one end an annular mounting flange 46 adjacent the front face 48 and remote from the rear face 50.

Figure 1:
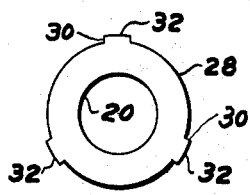
FIGURE 1 is a front elevation of a bearing bushing forming one component of the adhesively-mounted self-aligned bearing of the present invention.
Figure 2:
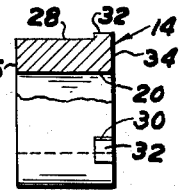
FIGURE 2 is a side elevation, partly in central vertical section, of the bearing bushing shown in FIGURE 1.
Figure 6:
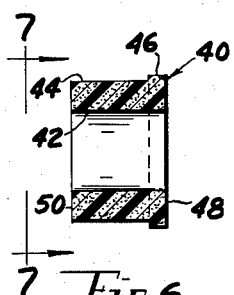
FIGURE 6 is a central vertical section through a bearing bushing similar to FIGURES 1 and 2 but composed of a sintered powdered plastic such as polyamide plastic known commercially as nylon.
Figure 7:
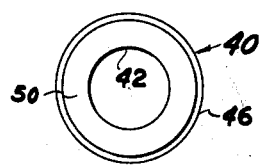
FIGURE 7 is a rear elevation of the sintered polyamide plastic bearing bushing shown in FIGURE 6, looking in the direction of the line 7—7.

In the process of making the adhesively-mounted self-aligned bearing installation 10 of FIGURES 3 and 5, let it be assumed that a suitable bearing bushing, such as the bearing bushing 14 of FIGURES 1 and 2 or the bearing bushing 40 of FIGURES 6 and 7 has been produced by suitable machinery, that of FIGURES 1 and 2 being cast or machined and that of FIGURE 6 being pressed from polyamide plastic powder in a suitable press and afterward sintered to impart the proper strength and density thereto. The mounting bore 22 is also suitably formed in the bearing mount 12, as by drilling or boring operations, relatively to the reference face 24—usually with its axis perpendicular to the reference surface 24. The operator then coats the surface of the bore 22 with a layer 52 of a suitabe non-metallic adhesive compound or packing material such as the synthetic plastic material known in the plastics industry as epoxy resin. It is preferred that the particular epoxy resin shall be of sufficiently high viscosity to fill up the clearance space and adhere to the mounting bore 22 without running out and becoming too thin. An epoxy resin of medium high viscosity which has been found suitable for the purpose of the present invention is that sold under the trademark "Lock-Tite" and manufactured by the American Sealants Company of Hartford, Conn. The viscosity range of the preferred plastic is preferably around 150 centipoises in order to fill the clearance of .005 to .010 inch between the outer bearing bushing surface 28 and the mounting bore surface 22. A material of lower viscosity would tend to run out unless special precautions were taken. This medium high viscosity plastic also possesses a reasonably short jell time, such as five or ten minutes at room temperature (70 degrees to 75 degrees F.) and consequently makes a very practical arrangement which is easy to handle on a commercial manufacturing scale. Moreover, the time required for properly curing this plastic layer 16 can be varied by varying the temperature over a wide possible time range. Curing could require eight or ten hours at room temperature, ten to twelve hours at 200° F. or only 3 or 4 hours at 360° F. Such acceleration of the curing or setting time is required only when the machine or other apparatus employing the bearing is put to use immediately after assembly.

Furthermore, the adhesive mounting resin described above also has the advantage that the component parts of the bearing installation 10 can be coated a considerable length of time before setting takes place. In the particular "Lock-Tite" epoxy resin mentioned above, setting does not commence until the parts are assembled. Thus, either or both of the surfaces 22 and 28 may be coated with the resin layer 52, but setting commences only when assembly of the parts is commenced, as by the self-alignment motion of the shaft 18 relatively to the mounting bore 22. This is a great convenience in manufacturing such parts upon a mass production scale. However, while the above particular epoxy formulation is most convenient in the practice of this invention, it is to be understood that other resinous adhesive systems which are not necessarily made reactive upon the application of pressure are equally applicable.

When either the mounting bore surface 22 or the bearing bushing outer surface 28 have been so coated, the operator inserts the bearing bushing 14 into the bearing mount bore 22, with the shaft 18 mounted in the bearing bushing bore 20 and with its axis located in the desired position. This action squeezes the plastic layer 52 from its approximately uniform thickness into the plastic layer 16 of non-uniform thickness or of wedge-shaped longitudinal section, if misalignment of the shaft 18 relatively to the mounting bore 22 exists. The radial lands 30 of the bearing bushing 14, or the annular flange 46 of the bearing bushing 40 (FIGURE 6) comes substantially into contact with the mounting bore 22 during this aligning operation and the pressure arising from assembly of the parts causes setting of the plastic mounting layer 16 to commence immediately.

Figure 4:
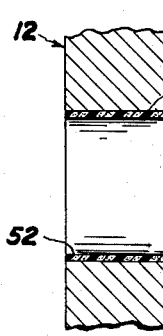
FIGURE 4 is a central vertical longitudinal section through a bearing mount with the mounting bore coated with a non-metallic mounting material in the first step of making the self-aligned bearing of FIGURE 3.

When the resin layer 16 has attained a proper set, either at room temperature or by the added use of heat, the bearing bushing 14 or 40 becomes rigidly locked in assembly with the bearing mount 12 so as to be substantially immovable relatively thereto. The medium high viscosity of the adhesive plastic constituting the layer 52 of FIGURE 4 which consequently becomes the layer 16 of FIGURES 3 and 5 retains the plastic 52 or 16 within the mounting bore 22 so that it does not tend to run out. The above-mentioned epoxy resin of which the layers 52 and 16 are preferably composed jells in a satisfactorily short time, such as in five or ten minutes at room temperature (70° to 75° F.) and results in a very practical arrangement which is easy to handle under factory production conditions.

The time required for the plastic layer 16 to cure can be varied by varying the temperature, possibly requiring as long as eight or ten hours at the above room temperature, ten to twelve minutes at 200° F., or three to four minutes at 360° F. The acceleration of the setting time by the use of the temperature higher than room temperature is required only when the apparatus including the bearing installation 10 is to be put to use immediately after the assembly of its components. The control of the temperature as stated above enables the assembly operations to be carried out using pre-coated component parts in ample time before the plastic layer 16 sets or hardens, so as to bring about the self-alignment of the component parts. Thereafter, the adhesive plastic coating 16 by curing forms a rigid and retentive bond between the mount 12 and bearing bushing 14 a sufficient period of time before the bearing installation 10 is put to use.

Figure 8:
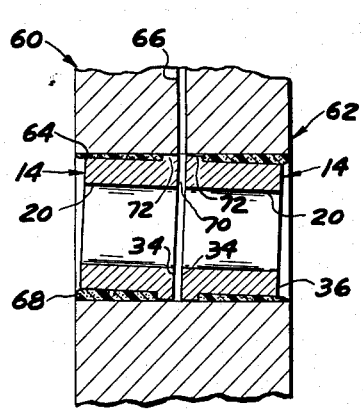
FIGURE 8 is a central vertical section through an adhesively mounted self-aligned double-bushing bearing installation, according to a modification of the invention, taken along the line 8—8 in FIGURE 9.
Figure 9:
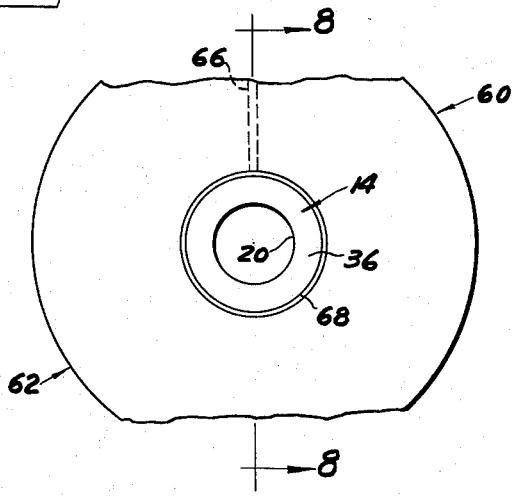
FIGURE 9 is a front elevation of the bearing installation shown in FIGURE 8.

The modified adhesively-mounted self-aligned bearing installation, generally designated 60, is particularly well adapted for use under conditions where a greater angle of tilt may be needed for self-alignment or a greater length of bearing contact is desired than is conveniently afforded by the use of a single bearing bushing 14 in FIGURES 1 to 5 inclusive or the bearing bushing 40 of FIGURES 6 and 7. In the adhesively-mounted self-aligned bearing installation 60 of FIGURES 8 and 9, the bearing mount 62 has an elongated mounting bore 64 therein which is lubricated by a radial lubricant passageway 66 leading thereto. The mounting bore 64, as before, is provided with a coating 68 of the same adhesive resin described above, such as the "Lock-Tite" epoxy resin layer 52 of FIGURE 4 which became the layer 16 of FIGURE 5 after assembly.

The bearing installation 60, however, makes use of a plurality of the bearing bushings 14 of the type shown in FIGURES 1 and 2 or 6, arranged in tandem, with either interrupted or circumferentially continuous flanges or lands 72 disposed adjacent the lubricant passageway 16 but with their front faces 34 spaced axially or longitudinally apart from one another to permit the flow of lubricant through the space 70 between them. The operation of assembling the bearing installation 60 is otherwise similar to that described above in connection with FIGURES 4 and 5, the shaft 18 passing through the bearing bores 20 and aligning them with one another. As before, the setting of the plastic layer 68, which has been squeezed into the condition of wedge-shaped longitudinal section of FIGURE 8, begins upon assembly, and occupies the same time previously described above. The two short bushings 14 arranged in tandem in the modified bearing installation 60, however, enable a greater range of tilt of the shaft than is obtainable with a single long bushing equal to the combined lengths of the two bushings, since each short bushing can tilt through a greater angle before hitting the mounting bore.

Experience with the self-aligned bearing of the present invention shows that, as a more rigidly-mounted bearing than a so-called self-aligning bearing, it gives considerably greater bearing life than the self-aligning bearing. It is believed that the reason for this greater length of bearing life of the self-aligned rigid bearing of the present invention is traceable to the so-called "slipstick" phenomenon. In a self-aligning or floatably-mounted bearing, during the "stick" period of operation where frictional forces peak up, the bearing tends to go with the shaft until the so-called "break-loose" action occurs. At that time it would seem apparent that inordinately high velocities would be necessary since the bearing returns to its mean floatably-held position in a direction contrary to the direction in which it is urged by the rotation of the shaft. During this very short interval, velocity peak must occur.

In contrast to this detrimental and life-shortening action arising in floatably-mounted or self-aligning bearings hitherto provided, the self-aligned or rigidly-mounted bearing of the present invention does not have as great a tendency to go with the shaft during the stick period, hence it would seem from this observation that velocity peaks do not occur therein.

The noise levels of various types of bearings have been measured in comparison with the nose levels of the self-aligned rigidly-mounted bearing of the present invention and the test reports show that the latter exhibit considerably lower noise levels than prior types of self-aligning or floatably-mounted bearings.

What I claim is:

1. A permanently self aligned bearing assembly comprising a bearing mount having a bearing bushing mounting bore therein, a bearing bushing within said bore of substantially smaller outside diameter than the diameter of said bore, said bushing having an exterior peripheral surface spaced from the surface of said bore and a shaft receiving bore therethrough, a plurality of substantially coplanar and circumferentially spaced projections projecting outwardly from said exterior peripheral surface of said bushing, said projections having an axial dimension only a minor fraction of the axial dimension of said bushing, said projections having outer ends engaging said bore surface so as to center at least a portion of said bushing relative to said bore and permitting said bushing to tilt relative to said bore during assembly of said bearing assembly, a shaft extending through and movably mounted within said shaft receiving bore, a plastic non-metallic adhesive sleeve filling the space between said bushing and bushing mounting bore, said plastic sleeve securely bonded to the outer peripheral surface of said bushing and the surface of said bore so as to permanently secure said bushing to said bearing mount and to dampen vibrations and noise.

2. A device as defined in claim 1, wherein said plastic non-metallic adhesive sleeve is composed of epoxy resin.

3. A bearing assembly as defined in claim 1, wherein two of said bushings are provided within said bore, said bushings have adjacent ends spaced from one another and being axially aligned with one another, and said bearing mount being provided with a lubricant passage therein which terminates within said bore and between said adjacent ends of said bushings.

References Cited in the file of this patent

UNITED STATES PATENTS

| | | |
|---|---|---|
| 2,531,334 | Grenat | Nov. 21, 1950 |
| 2,673,767 | Schoeppner | Mar. 30, 1954 |
| 2,776,175 | Waite | Jan. 1, 1957 |
| 2,931,684 | Johnson | Apr. 5, 1960 |